US012252968B1

(12) United States Patent
Alsaleh et al.

(10) Patent No.: US 12,252,968 B1
(45) Date of Patent: Mar. 18, 2025

(54) SUSTAINED CASING PRESSURE MANAGEMENT SYSTEM AND METHOD OF USE

(71) Applicant: SAUDI ARABIAN OIL COMPANY, Dhahran (SA)

(72) Inventors: Mohammad W. Alsaleh, Mubarraz (SA); Jafar S. Alzaid, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/457,092

(22) Filed: Aug. 28, 2023

(51) Int. Cl.
*E21B 43/12* (2006.01)
*C09K 8/52* (2006.01)
*E21B 43/34* (2006.01)

(52) U.S. Cl.
CPC .............. *E21B 43/12* (2013.01); *C09K 8/52* (2013.01); *E21B 43/34* (2013.01); *C09K 2208/20* (2013.01); *E21B 2200/20* (2020.05)

(58) Field of Classification Search
CPC ................................ C09K 8/52; E21B 43/12
USPC ........................................................ 166/267
See application file for complete search history.

(56) References Cited

U.S. PATENT DOCUMENTS

| | | | |
|---|---|---|---|
| 8,353,351 B2 | 1/2013 | Carpenter et al. | |
| 11,261,712 B2 * | 3/2022 | Muraikhi | E21B 34/02 |
| 11,549,340 B2 | 1/2023 | Chitwood et al. | |
| 2010/0200242 A1 * | 8/2010 | Rodger | E21B 43/34 |
| | | | 494/39 |
| 2019/0153821 A1 * | 5/2019 | Douglas | E21B 43/12 |
| 2020/0190948 A1 * | 6/2020 | Chitwood | E21B 36/04 |
| 2023/0121277 A1 | 4/2023 | Al-Baiyat | |

FOREIGN PATENT DOCUMENTS

WO 2004037947 A1 5/2004

OTHER PUBLICATIONS

Bourgoyne et al., "Sustained Casing Pressure in Offshore Producing Wells," Offshore Technology Conference, OTC 11029, May 1999, 13 pages.
Kinik et al., "Identifying Environmental Risk of Sustained Casing Pressure," Society of Petroleum Engineers, SPE 143713, Mar. 2011, 12 pages.

* cited by examiner

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A system includes a control system disposed on a well surface and a pipe component disposed in a wellbore to form an annulus that is in fluid communication with a reservoir. The system includes a valve in fluid communication with the annulus. The system includes a recorder configured to detect data of the annulus. The system includes a fluid conduit configured to flow annular fluid from one or more annuli disposed in the wellbore. The fluid conduit is in fluid communication with the annulus, the valve, and a relief tank. The system includes a communication cable coupled to the control system, the valve, and the recorder. The recorder is configured to transmit the data to the control system.

10 Claims, 7 Drawing Sheets

SUSTAINED CASING PRESSURE MANAGEMENT SYSTEM AND METHOD OF USE

BACKGROUND

Various oil and gas wells use tubular elements as components of the wellbore. Multiple tubular elements of incrementally smaller diameters are installed concentrically within larger sizes. An annular space is formed between the inside diameter of the larger tubular element and the outside diameter of the smaller tubular element. Pressure from the wellbore may be present in the annular space. For example, the wellbore may be exposed to pressurized water, oil, and/or gas from below the bottom end of each tubular element. The pressure may propagate between the tubular elements to the top of each tubular element and may reach the surface. A sealing material may be installed in the annular space to seal the pressure from reaching the surface. Seepage of the pressure past the sealing material may result in pressure at the surface. In some cases, the pressure at the surface may exceed allowable ratings.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, a system including: a control system disposed on a well surface and a first pipe component disposed in a wellbore to form a first annular space, of one or more annuli, between a pipe outside diameter and a wellbore. The first annular space is in fluid communication with a pressurized reservoir. The system also includes a first control valve in fluid communication with the first annular space. The first control valve includes a first communication interface. The system also includes a first recorder configured to detect first recorder data of the first annular space and a fluid conduit configured to flow annular fluid from the one or more annuli disposed in the wellbore. The fluid conduit is in fluid communication with the first annular space, the first control valve, and a relief tank. The system also includes a communication cable coupled to the control system, the first control valve, and the first recorder. The first recorder is configured to transmit the first recorder data to the control system using the first communication interface.

This disclosure presents, in accordance with one or more embodiments, an apparatus including: a level sensor, a pressure sensor, a temperature sensor, and a data cable connector configured to couple to a data cable. The system also includes a communication interface coupled to the data cable, and a processor coupled to the level sensor, the pressure sensor, the temperature sensor, and the communication interface. The system also includes a memory coupled to the processor, wherein the memory includes instructions configured to perform a method. The method includes: obtain a command to generate tank data, generate the tank data using the level sensor, the pressure sensor, and the temperature sensor, and transmit the tank data over the data cable using the communication interface.

This disclosure presents, in accordance with one or more embodiments, a method including: drilling a wellbore of a well from a surface to form a fluid communication path from a pressurized reservoir to the surface and installing a first pipe component in the wellbore to form a first annular space between a pipe outside diameter and a wellbore. The first annular space is in fluid communication with the pressurized reservoir. The method includes transmitting, by a control system, a first command to a pressure recorder configured to generate annular pressure data of an annular fluid in the first annular space. The method includes transmitting, by the control system, a second command to the pressure recorder, wherein the first command and the second command are separated by a predetermined time duration. The method includes generating, in response to receipt of the first command, first annular first pressure data using the pressure recorder. The method includes generating, in response to receipt of the second command, first annular second pressure data using the pressure recorder. The method includes obtaining, by the control system in response to transmitting the first command, the first annular first pressure data from the pressure recorder. The method includes obtaining, by the control system in response to transmitting the second command, the first annular second pressure data from the pressure recorder. The method includes comparing, using the control system, the first annular first pressure data and the first annular second pressure data with a first set of predetermined criteria. The method includes controlling, using the control system, a first control valve in fluid communication with the first annular space in response to the comparing. The method includes filling a relief tank using the annular fluid flowing through a fluid conduit in fluid communication with the first annular space, the first control valve, and the relief tank.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for monitoring one or more annular areas of a wellbore for a pressure and managing the pressure. The monitoring may include monitoring of other characteristics such as temperature, monitoring for composition, such as oil, gas, and water, and monitoring for contaminants such as hydrogen sulfide and carbon dioxide. The system may monitor for rates of changes of the characteristics, compositions, and contaminants. Each annular area may be termed an annulus. More than one annulus are termed annuli. In particular, remediating pressure detected at the surface in the annulus may prove difficult. Past techniques to remediate casing annulus pressure include working over the well.

The following system and method idea, i.e., the invention, targets specific oil wells that are scheduled for an upcoming workover and that have specific conditions such as low Casing-Casing Annulus (CCA) bleed-off rate. The system and method enable production operations to continue by managing CCA pressure (pressure in the annulus) for wells with CCA pressure problems.

Figure 1:
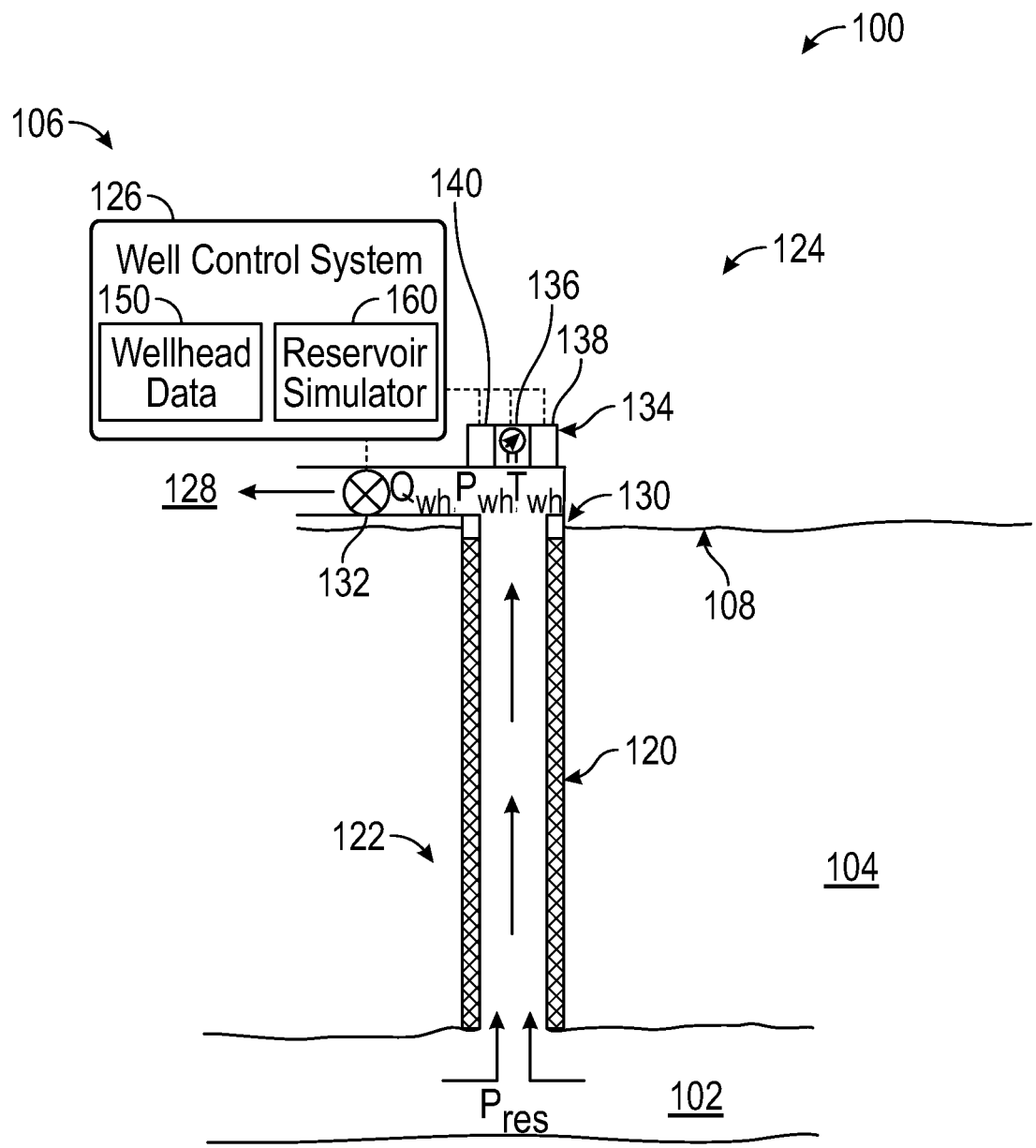
FIGS. 1, 2, 3, 4, and 5 show systems in accordance with one or more embodiments.

FIG. 1 shows a schematic diagram in accordance with one or more embodiments. As shown in FIG. 1. FIG. 1 illustrates a wellsite 100 that includes a hydrocarbon reservoir (e.g., reservoir 102) located in a subsurface hydrocarbon-bearing (e.g., formation 104) and a well system 106. The formation 104 may include a porous or fractured rock formation that resides underground, below the surface of the earth or below a seabed (hereafter surface e.g., surface 108). In the case of the well system 106 being a hydrocarbon well, the reservoir 102 may include a portion of the formation 104. The formation 104 and the reservoir 102 may include different layers of rock having varying characteristics, such as varying degrees of permeability, porosity, and resistivity. In the case of the well system 106 being operated as a production well, the well system 106 may facilitate the extraction of hydrocarbons from the reservoir 102.

In some embodiments, the well system 106 includes a wellbore 120, a well sub-surface system 122, a well surface system 124, and a well control system 126. The well control system 126 may control various operations of the well system 106, such as well production operations, well completion operations, well maintenance operations, and reservoir monitoring, assessment, and development operations. In some embodiments, the well control system 126 includes a computer system that is the same as or similar to that of computer system (e.g., a computer 702) described below in FIG. 7 and the accompanying description.

The wellbore 120 may include a bored hole that extends from the surface 108 into a target zone of the formation 104, such as the reservoir 102. An upper end of the wellbore 120, terminating at or near the surface 108, may be referred to as the "up-hole" end of the wellbore 120, and a lower end of the wellbore, terminating in the formation 104, may be referred to as the "downhole" end of the wellbore 120. The wellbore 120 may facilitate the circulation of drilling fluids during drilling operations, the flow of hydrocarbon (e.g., oil and gas) production (e.g., production 128) from the reservoir 102 to the surface 108 during production operations, the injection of substances (e.g., water) into the formation 104 or the reservoir 102 during injection operations, or the communication of monitoring devices (e.g., logging tools) into the formation 104 or the reservoir 102 during monitoring operations (e.g., during in situ logging operations).

In some embodiments, during operation of the well system 106, the well control system 126 collects and records wellhead data 150 for the well system 106 and other data regarding downhole equipment and downhole sensors (e.g., using an automatic computer-controlled management system described herein.) The wellhead data 150 may include, for example, a record of measurements of wellhead pressure (P) (e.g., including flowing wellhead pressure (FWHP)), wellhead temperature (T) (e.g., including flowing wellhead temperature), wellhead production rate (Q) over some or all of the life of the well system 106, and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data 150 may be referred to as "real-time" wellhead data. Real-time wellhead data may enable an operator of the well system 106 to assess a relatively current state of the well system 106, and make real-time decisions regarding development of the well system 106 and the reservoir 102, such as on-demand adjustments in regulation of production flow from the well.

With respect to water cut data, the well system 106 may include one or more water cut sensors. For example, a water cut sensor may be hardware and/or software with functionality for determining the water content in oil, also referred to as "water cut." Measurements from a water cut sensor may be referred to as water cut data and may describe the ratio of water produced from the wellbore 120 compared to the total volume of liquids produced from the wellbore 120. In some embodiments, a water-to-gas ratio (WGR) is determined using a multiphase flow meter. For example, a multiphase flow meter may use magnetic resonance information to determine the number of hydrogen atoms in a particular fluid flow. Since oil, gas and water all contain hydrogen atoms, a multiphase flow may be measured using magnetic resonance. In particular, a fluid may be magnetized and subsequently excited by radio frequency pulses. The hydrogen atoms may respond to the pulses and emit echoes that are subsequently recorded and analyzed by the multiphase flow meter.

In some embodiments, the well surface system 124 includes a wellhead 130. The wellhead 130 may include a rigid structure installed at the "up-hole" end of the wellbore 120, at or near where the wellbore 120 terminates at the surface 108. The wellhead 130 may include structures for supporting (or "hanging") casing and production tubing extending into the wellbore 120. Production 128 may flow through the wellhead 130, after exiting the wellbore 120 and the well sub-surface system 122, including, for example, the casing and the production tubing. In some embodiments, the well surface system 124 includes flow regulating devices that are operable to control the flow of substances into and out of the wellbore 120. For example, the well surface system 124 may include one or more of a production valve 132 that are operable to control the flow of production 128. For example, a production valve 132 may be fully opened to enable unrestricted flow of production 128 from the wellbore 120, the production valve 132 may be partially opened to partially restrict (or "throttle") the flow of production 128 from the wellbore 120, and production valve 132 may be fully closed to fully restrict (or "block") the flow of production 128 from the wellbore 120, and through the well surface system 124.

Keeping with FIG. 1, in some embodiments, the well surface system 124 includes a surface sensing system 134. The surface sensing system 134 may include sensor devices for sensing characteristics of substances, including production 128, passing through or otherwise located in the well surface system 124. The characteristics may include, for example, pressure, temperature, and flow rate of production 128 flowing through the wellhead 130, or other conduits of the well surface system 124, after exiting the wellbore 120.

In some embodiments, the surface sensing system 134 includes a surface pressure sensor 136 operable to sense the pressure of production 128 flowing through the well surface system 124, after it exits the wellbore 120. The surface pressure sensor 136 may include, for example, a wellhead pressure sensor that senses a pressure of production 128 flowing through or otherwise located in the wellhead 130. In some embodiments, the surface sensing system 134 includes a surface temperature sensor 138 operable to sense the temperature of production 128 flowing through the well surface system 124, after it exits the wellbore 120. The surface temperature sensor 138 may include, for example, a wellhead temperature sensor that senses a temperature of production 128 flowing through or otherwise located in the wellhead 130, referred to as "wellhead temperature" (T). In some embodiments, the surface sensing system 134 includes a flow rate sensor 140 operable to sense the flow rate of production 128 flowing through the well surface system 124, after it exits the wellbore 120. The flow rate sensor 140 may include hardware that senses a flow rate of production 128 (Q) passing through the wellhead 130.

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore 120. Likewise, well operations may include open-hole completions or cased-hole completions. For example, an open-hole completion may refer to a well that is drilled to the top of the hydrocarbon reservoir. Thus, the well may be cased at the top of the reservoir and left open at the bottom of a wellbore. In contrast, cased-hole completions may include running casing into a reservoir region.

In one well completion example, the sides of the wellbore 120 may require support, and thus casing may be inserted into the wellbore 120 to provide such support. After a well has been drilled, casing may ensure that the wellbore 120 does not close in upon itself, while also protecting the wellstream from outside contaminants, like water or sand. Likewise, if the formation is firm, casing may include a solid string of steel pipe that is run in the well and will remain that way during the life of the well. In some embodiments, the casing includes a wire screen liner that blocks loose sand from entering the wellbore 120.

In another well operation example, a space between the casing and the untreated sides of the wellbore 120 may be cemented to hold a casing in place. This well operation may include pumping cement slurry into the wellbore 120 to displace existing drilling fluid and fill in this space between the casing and the untreated sides of the wellbore 120. Cement slurry may include a mixture of various additives and cement. After the cement slurry is left to harden, cement may seal the wellbore 120 from non-hydrocarbons that attempt to enter the wellstream. In some embodiments, the cement slurry is forced through a lower end of the casing and into an annulus between the casing and a wall of the bored hole of the wellbore 120. More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore 120 to enable hydrocarbons to enter a wellstream from the resulting holes. For example, some perforation operations include using a perforation gun at one or more reservoir levels to produce holed sections through the casing, cement, and sides of the wellbore 120. Hydrocarbons may then enter the wellstream through these holed sections. In some embodiments, perforation operations are performed using discharging jets or shaped explosive charges to penetrate the casing around the wellbore 120.

In another well completion, a filtration system may be installed in the wellbore 120 in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore 120 between a casing's slotted liner and the sides of the wellbore 120. The slotted liner and the gravel pack may filter sand and other debris that might have otherwise entered the wellstream with hydrocarbons. In another well completion, a wellhead assembly may be installed on the wellhead of the wellbore 120. A wellhead assembly may include a production tree (also called a Christmas tree) that includes valves, gauges, and other components to provide surface control of subsurface conditions of a well.

In some embodiments, a wellbore 120 includes one or more casing centralizers. For example, a casing centralizer may be a mechanical device that secures casing at various locations in a wellbore to prevent casing from contacting the walls of the wellbore. Thus, casing centralization may produce a continuous annular clearance around casing such that cement may be used to completely seal the casing to walls of the wellbore. Without casing centralization, a cementing operation may experience mud channeling and poor zonal isolation. Examples of casing centralizers may include bow-spring centralizers, rigid centralizers, semi-rigid centralizers, and mold-on centralizers. In particular, bow springs may be slightly larger than a particular wellbore in order to provide complete centralization in vertical or slightly deviated wells. On the other hand, rigid centralizers may be manufactured from solid steel bar or cast iron with a fixed blade height in order to fit a specific casing or hole size. Rigid centralizers may perform well even in deviated wellbores regardless of any particular side forces. Semi-rigid centralizers may be made of double crested bows and operate as a hybrid centralizer that includes features of both bow-spring and rigid centralizers. The spring characteristic of the bow-spring centralizers may allow the semi-rigid centralizers to compress in order to be disposed in tight spots in a wellbore. Mold-on centralizers may have blades made of carbon fiber ceramic material that can be applied directly to a casing surface.

In some embodiments, well intervention operations may also be performed at a well site. For example, well intervention operations may include various operations carried out by one or more service entities for an oil or gas well during its productive life (e.g., hydraulic fracturing operations, coiled tubing, flow back, separator, pumping, wellhead and production tree maintenance, slickline, braided line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations are used to provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore 120 prior to delivering the well to a producing entity.

Turning to the reservoir simulator 160, a reservoir simulator 160 may include hardware and/or software with functionality for performing a well simulation (e.g., well simulations of the wellbore of one or more wells) such as storing and analyzing well logs, production data, sensor data (e.g., from a wellhead, downhole sensor devices, or flow control devices), and/or other types of data to generate and/or update one or more geological models of one or more reservoir regions. Geological models may include geochemical or geomechanical models that describe structural relationships within a particular geological region. Likewise, a reservoir simulator 160 may also determine changes in reservoir pressure and other reservoir properties for a geological region of interest, e.g., in order to evaluate the health of a particular reservoir during the lifetime of one or more producing wells.

While the reservoir simulator 160 is shown at a well site, in some embodiments, the reservoir simulator 160 or other components in FIG. 1 may be remote from a well site. In some embodiments, the reservoir simulator 160 is implemented as part of a software platform for the well control system 126. The software platform may obtain data acquired by a control system as inputs, which may include multiple data types from multiple sources. The software platform may aggregate the data from these systems in real time for rapid analysis. In some embodiments, the well control system 126 and the reservoir simulator 160, and/or a user device coupled to one of these systems may include a computer system that is similar to the computer system (e.g., computer 702) described below with regard to FIG. 7 and the accompanying description.

In some embodiments, the reservoir simulator 160 may include software configured with machine learning capabilities and artificial intelligence (AI) that learn from trends of the one or more parameters tracked by the well control system 126.

In one or more embodiments, the AI and machine learning (ML) capabilities employed by the reservoir simulator may include any suitable algorithms and processes for predicting well behavior using historical data as input. For example, the ML models or algorithms may include supervised algorithms, unsupervised algorithms, deep learning algorithms that use artificial neural networks (ANN), etc. More specifically, supervised ML models include classification, regression models, etc. Unsupervised ML models include, for example, clustering models. Deep-learning algorithms are a part of ML algorithms based on artificial neural networks with representation learning. For example, the deep-learning algorithm may run data through multiple layers of neural network algorithms, each of which passes a simplified representation of the data to the next layer. With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights and biases for adjusting the data inputs. These network weights and biases may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through an activation function of a neuron to other hidden layers within the neural network. As such, the activation function may determine whether, and to what extent, an output of a neuron progresses to other neurons where the output may be weighted again for use as an input to the next hidden layer.

In some embodiments, a machine-learning model may include an encoder model that transforms input data to a latent representation vector. The machine-learning model may further amalgamate the latent representation vector with a vector representation of a particular parameterization to produced combined data, e.g., using in a latent space domain. Likewise, the machine-learning model may also include a decoder model that transforms the combined vector into the corresponding output data according to the parameterization.

In some embodiments, the machine-learning model is a variational autoencoder. For example, variational autoencoders may compress input information into a constrained multivariate latent distribution through encoding in order to reconstruct the information during a decoding process. Thus, variational autoencoders may be used in unsupervised, semi-supervised, and/or supervised machine-learning algorithms. More specifically, variational autoencoders may perform a dimensionality reduction that reduces the number of features within an input dataset (such as an input gather). This dimensionality reduction may be performed by selection (e.g., only some existing features are preserved) or by extraction (e.g., a reduced number of new features are produced from preexisting features). Thus, an encoder process may compress the input data (i.e., from an initial space to an encoded space or latent space), while a decoder process may decompress the compressed data. This compression may be lossy, such that a portion of the original information in the input dataset cannot be recovered during the decoding process.

In some embodiments, various types of machine learning algorithms may be used to train the model that is used to predict CCA behavior in new wells, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function.") The error function may be based on various criteria, such as mean squared error function, a similarity function, etc., where the error function may be used as a feedback mechanism for tuning weights in the electronic model.

Figure 2:
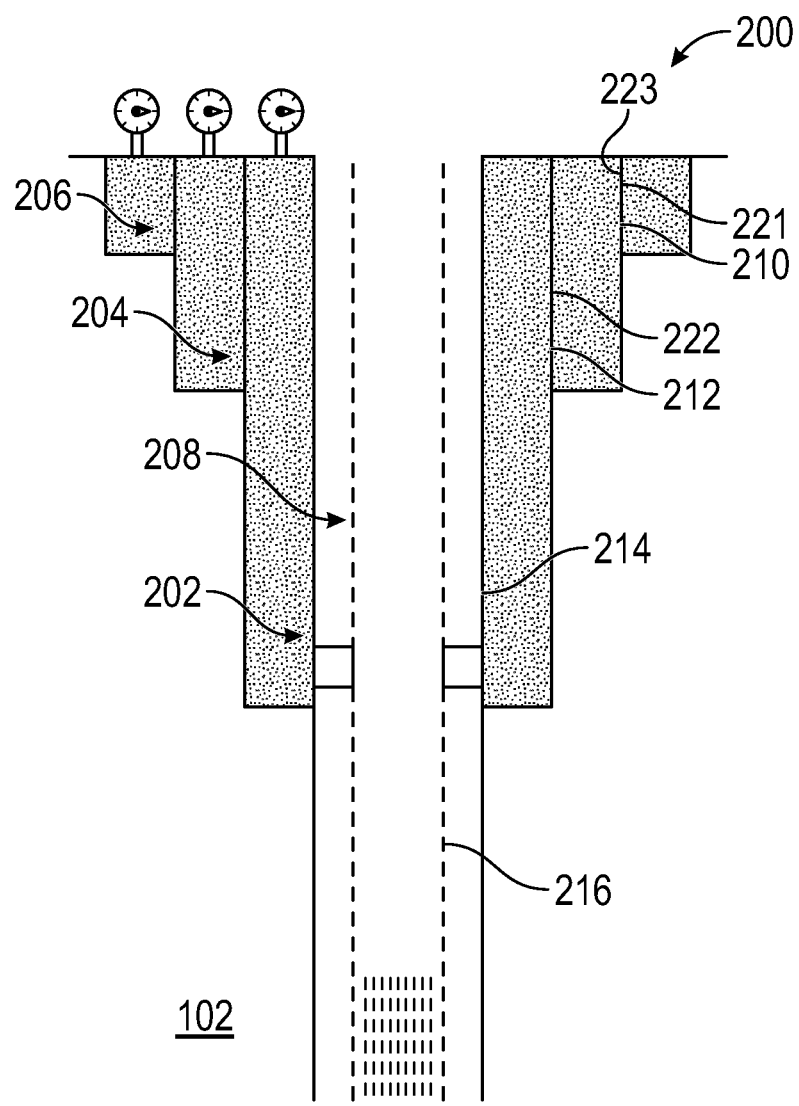

FIG. 2 shows a cross-section view 200 of multiple annuli (e.g., Annulus-A 202, Annulus-B 204, Annulus-C 206, tubing-casing Annulus (e.g., tubing-casing annulus 208) adjacent to one another and monitored using dedicated valves coupled to the management system in accordance with one or more embodiments. One or more of the annuli may be in pressure communication with the reservoir (e.g., reservoir 102). In some embodiments, the pressure in between the casings (e.g., 210, 212, 214) is measured by surface gauges assembled at the wellhead (e.g., wellhead 130 FIG. 1). CCA pressure may be developed due to cement failure and communication from a source such as a downhole formation or trapped fluid in the cement due to heat expansion. In both cases where CCA is developed, the communication may occur when there is cement failures due to micro-channeling or formation of a micro-annulus.

In one or more embodiments, CCA pressure may be reduced by bleeding-off the current pressure and monitoring the ongoing pressure. Following pressure bleed-off, the well may be operated as normal. In this manner, pressure build-up rate, if any, may be monitored and analyzed to identify a source of the fluid. Once CCA pressure is expected or identified, the system may generate a workover order to prevent CCA pressure issues.

In oil, gas, and water wells the major pressure barrier and isolating element between the pressurized gas and fluids at the bottom of the well and surface of the well is the cement which is placed in the annulus between one casing and another casing. The cement barrier is considered very important for the integrity of the well. The annulus is an annular space between a casing pair of a first size (diameter and wall thickness) and a second size. The first size and the second size differ such that the second casing fits inside the first casing (or vice-versa) thereby forming the casing pair. For example, the annular space is formed between the outside of the second casing and the inside of the first casing. This annular space is termed a Casing-Casing Annulus (CCA). Subsequent casings installed within casing form more annuli and thus additional CCAs.

Each annulus may have a specific name. For example, the Casing-Wellbore Annulus (CWA) may refer to the annular space between the pipe OD, i.e., an outer diameter (e.g., first OD 221) of the largest diameter casing and the wellbore (e.g., wellbore 120, FIG. 1). A Tubing-Casing Annulus (e.g., tubing-casing annulus 208) between tubing and innermost sting of casing may be TCA, e.g., 7" (inch) to 4½" (e.g., tubing 216). A Casing-Casing Annulus (CCA) may refer to the various annuli between pairs of casing, e.g., conductor casing and surface casing.

Various sizes of pairs of casing may have sequential suffixes such as CCA-3, CCA-4, CCA-5, to CCA-n, depending on the quantity of strings of casing the well has. For example, an annulus formed between casing pairs 13⅜" (e.g., casing 210) and 9⅝" (e.g., casing 212) may be CCA-2. A Casing-Casing Annulus may refer also to the annulus formed between a surface casing and an intermediate casing e.g., 9⅝" to 7" (e.g., casing 214) may be CCA-1 (e.g., Annulus-A 202).

In each case for CCA-1 through CCA-n, the annular space is formed by installing a second pipe component (e.g., casing 212) in the wellbore inside a first pipe component (e.g., casing 210). The annular space is formed between a second outside diameter (e.g., second OD 222) and a first pipe inside diameter (e.g., first ID 223).

The cement seals each of the CCAs. If the cement loses its seal, pressure may migrate past the cement. The migration may be known as communication across the cement seal or communication in between casings due to cement failures such as micro-channeling and/or micro-annulus. A CCA issue occurs when the migrated pressure accumulates within the CCA resulting in a CCA pressure. If the CCA pressure remains over a certain duration of time, it may be referred to as sustained casing pressure or sustained CCA pressure. If the resulting sustained CCA pressure fails to meet acceptable limits (e.g., CCA pressure exceeding an allowable upper limit), then the CCA pressure becomes a CCA pressure problem. Some CCA pressure problems may negatively impact well integrity.

The cement can lose its sealing capability due to several factors such as: (1) Poor cement job; (2) The age of the well; (3) High pressure source applied on the cement; (4) Abnormal pressure formation; and/or (5) Shallow gas zone. All the preceding factors may affect the cement job quality and induce channels in the cement. If the channels become interconnected, then the bottom hole pressure and potentially the wellbore gasses and fluids may travel to the surface of the well. In some cases, the well may have to be shut-in, i.e., taken off stream. The disclosed system and method may enable wells with CCA issues to remain in, or to return to, operational status, i.e., to stay or get back on stream.

To solve the cement channeling problem several methods may be utilized. A common method is to work over the well, i.e., to perform a workover operation to rework the well with a workover rig. The workover operation (i.e., the workover) can remediate the defective cement and isolate the source of the pressure. The workover has a relatively high cost and must be scheduled in advance. In some cases, an affected well may already be scheduled for workover in the near future (i.e., scheduled workover) for some other unrelated objective. In those cases, a short-term solution to the CCA pressure issue would be beneficial to manage the CCA pressure problem until the scheduled workover date. The scheduled workover then can solve the CCA issue. The disclosed system and method idea offers a short-term solution to manage the risk associated with the CCA pressure and make it possible to operate the well safely until the scheduled workover.

CCA pressure problems commonly arise with relatively old gas, oil, or water wells particularly if those wells were subjected to high pressure throughout the well history. Those wells may suffer from the Sustained Casing Pressure problem. Those wells may include production of contaminants such as sour gas, i.e., gases such as hydrogen sulfide, and corrosive gas, i.e., carbon dioxide.

The Sustained Casing Pressure problem, hereafter CCA pressure problem may be found within multiple annuli. Finding a solution for the CCA pressure problem is essential because the wells cannot be operated safely while jeopardizing well integrity. The disclosed system and method of use manages the CCA pressure problem and maintains the required safety measures while operating the CCA-affected wells (i.e., wells with CCA issues.) The disclosed includes a system configuration designed to satisfy the well operating conditions. The system will be equipped with an apparatus comprising devices to transfer real-time data including the tank fluid level and tank pressure to the responsible organization where the action can be taken accordingly.

Figure 3:
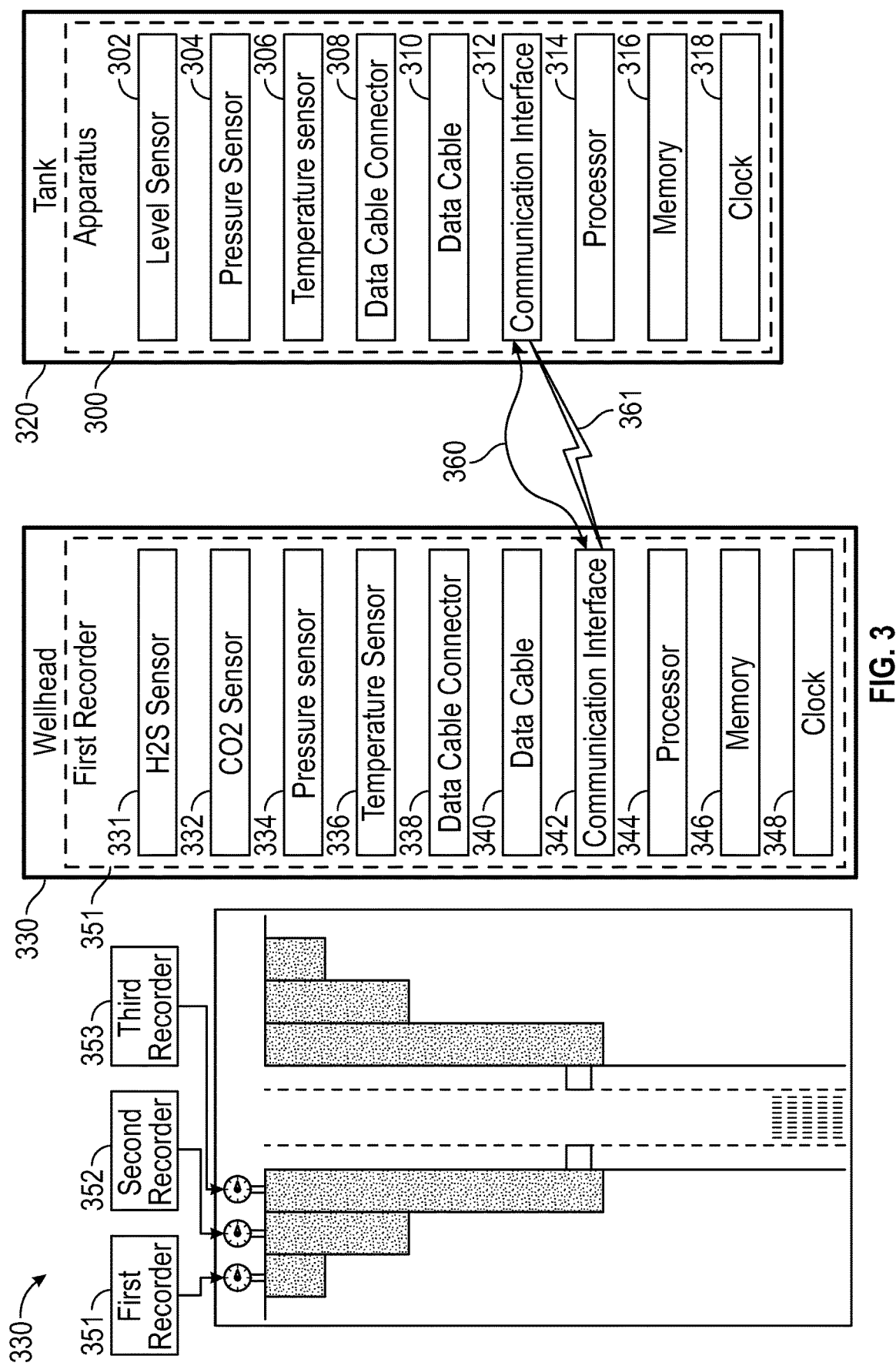

FIG. 3 shows the apparatus for managing CCA pressure. Specifically, FIG. 3 shows the apparatus for managing the unwanted high CCA pressures. The disclosed idea utilizes a surface tank designed to be operated to control the pressure and fluids coming out of the affected anulus or annuli. The tank may be specified to be mobile, transportable, and sized to fit in the bed of a truck.

FIG. 3 shows a schematic diagram illustrating an apparatus for managing CCA pressure. FIG. 3 shows a first recorder 351, a second recorder 352, and a third recorder 353 coupled to a first annular space, to a second annular space, and to a third annular space respectively. An apparatus (e.g., an apparatus 300) may acquire and store data regarding fluid level and pressure inside the tank. Acquisition of the data may commence upon obtaining a command to begin recording. The acquired data may be sent to the responsible party on a regularly scheduled interval, at a frequency determined by the characteristics of the data, and/or upon or soon after receipt of a command to send the data. The apparatus 300 may include a sensor for a fluid level (e.g., a level sensor 302) of an annular fluid in a relief tank (e.g., tank 320) and a sensor for tank pressure (e.g., pressure sensor 304) of the annular fluid in the relief tank. The apparatus may include a temperature sensor (e.g., temperature sensor 306) to detect the temperature of the annular fluid in the relief tank. The apparatus may include a data cable connector (e.g., connector 308) configured to couple to a data cable (e.g., data cable 310). The apparatus may include a communication interface (e.g., communication interface 312) coupled to the data cable. A processor (e.g., processor 314) may be coupled to the level sensor 302, the pressure sensor 304, the temperature sensor 306, and the communication interface 312. The processor may include a memory (e.g., memory 316) coupled to the processor. The memory may include instructions to perform a method. The method may include obtaining a command to generate tank data. The method may include generating the tank data using the level sensor, the pressure sensor, and the temperature sensor. The method may include transmitting the tank data over the data cable to the communication interface.

Apparatus 300 may include a clock 318, an instrument used for measuring the passage of time. The clock may be coupled to the processor and configured to record a timestamp (e.g., year, month, date, hour, minute, and second) of an event. For example, the clock may record a timestamp associated with a pressure detected by the pressure sensor, a temperature detected by the temperature sensor, and/or a fluid level detected by the level sensor. The clock may be configured to provide the timestamp upon receipt of a command. The apparatus, the control system, and/or the user device may send a command to the clock to provide the timestamp. The tank data, for example, may be associated with a timestamp. A timestamp of interest may be provided by the apparatus, may be sent by the control system and/or may be sent from a user device.

The communication interface may be configured to transmit the tank data regarding a timestamp of interest. The tank data regarding a timestamp of interest may be transmitted, using the communication interface, to a control system. The control system may send a first command to the apparatus to record the tank data at a first timestamp and then send a second command at a second timestamp separated from the first timestamp by a predetermined time duration. In this manner the control system may determine a change in the tank data. Subsequent commands such as a third command, a fourth command, through an $n^{th}$ command may produce tank data sent back to the control system from which the control system can determine a trend in the tank data such as a rate of change of the tank data.

Memory 316 may be configured to store the tank data. Memory 316 may store the tank data until receipt of a command to transmit the tank data using the level sensor, the pressure sensor, the temperature sensor, and/or the communication interface.

An Internet modem (e.g., communication interface 312) and emergency notification equipment or other communication equipment may be used to transfer the readings of the sensors (e.g., the tank data) to a responsible party.

FIG. 3 shows a schematic diagram illustrating that the apparatus 300 may be coupled to a casing-casing annulus data recorder ("recorder", e.g., the first recorder 351) used for determining annular fluid characteristics of annular spaces to manage CCA pressure, hereafter CCA data. The recorder may in turn be coupled to a wellhead (e.g., a wellhead 330). A recorder may acquire and store CCA data regarding fluid properties and compositions inside annular spaces (e.g., a casing-casing annulus) using one or more recorder sensors coupled to the recorder. Acquisition of the CCA data may commence upon obtaining a command to begin recording. The acquired data may be sent to the responsible party on a regularly scheduled interval, at a frequency determined by the characteristics of the data, and/or upon or soon after receipt of a command to send the data.

FIG. 3 shows that the apparatus 300 may be coupled for communicating with the first recorder 351 using a data cable (e.g., cable 360) or may communicate wirelessly (e.g., wireless communication 361). The communication interface 312 of the apparatus may communicate with the communication interface 342 of the recorder. The data cable may be replaced by wireless communication such as, for example, using routers and modems for a local area network and/or a wide area network, or using radio, microwave, Bluetooth, or cellular communication. The apparatus interface and/or the recorder interface may communicate to a user device through the control system and/or directly to the user device. The tank interface may communicate the data to the user device.

The CCA recorder (e.g., first recorder 351) may include, among the one or more recorder sensors, sensors for composition of the annular fluid in the CCA and contaminant detectors for undesirable components of the composition of the annular fluid. The contaminant detectors may detect, measure, record, and store contaminant data.

Contaminant data may include hydrogen sulfide concentration data from the contaminant detector. For example, the recorder may include a contaminant detector such as a hydrogen sulfide ($H_2S$) sensor (e.g., $H_2S$ sensor 331) for detecting $H_2S$ concentration data. The recorder may detect the $H_2S$ concentration data at a first timestamp of interest, at a second timestamp of interest, and/or at an $n^{th}$ timestamp of interest. Likewise, the recorder may detect $H_2S$ concentration at an area of interest, for example, a CCA of interest such as a first CCA, a second CCA, and/or an $n^{th}$ CCA. In this manner, at a first timestamp the recorder generates first annular first hydrogen sulfide concentration data. Likewise, at a second timestamp the recorder generates first annular second hydrogen sulfide concentration data.

The computer system obtains the contaminant data at the first timestamp, then again at a second timestamp. The computer system compares the contaminant data with a set of predetermined criteria. For example, predetermined criteria for $H_2S$ may include an $H_2S$ concentration in parts per million (ppm). An $H_2S$ concentration of 0.00011 to 0.00033 ppm may represent typical background concentration. An $H_2S$ concentration of 0.01 to 1.5 ppm may be the limit at which the odor is detectable. An $H_2S$ concentration of 100 ppm may reflect the threshold of IDLH or immediately dangerous to live and health.

Contaminant data may include carbon dioxide concentration data from the contaminant detector. As another example, the recorder may include a contaminant detector such as a carbon dioxide sensor (e.g., CO2 sensor 332) for detecting $CO_2$ concentration data. The recorder may detect $CO_2$ concentration data at timestamps of interest and at CCAs of interest. The recorder may include a pressure sensor, (e.g., pressure sensor 334), and/or a temperature sensor (e.g., temperature sensor 336). The recorder may detect pressure data and temperature data at timestamps and CCAs of interest. For example, at a first timestamp the recorder generates first annular first pressure data. Likewise, at a second timestamp the recorder generates first annular second pressure data.

The recorder may include a data cable connector (e.g., connector 338) configured to couple to a data cable (e.g., data cable 340). The recorder may include a communication interface (e.g., communication interface 342) coupled to the data cable. A processor (e.g., processor 344) may be coupled to the $H_2S$ sensor 331, the $CO_2$ sensor 332, the pressure sensor 334, the temperature sensor 336, and the communication interface 342. The processor may include a memory (e.g., memory 346) coupled to the processor. The memory may include instructions to perform a method. The method may include obtaining a command to generate CCA data. The method may include generating the CCA data using the $H_2S$ sensor and the $CO_2$ sensor, the pressure sensor, and the temperature sensor. The method may include transmitting the CCA data over the data cable to the communication interface.

The recorder may include a clock 348, an instrument used for measuring the passage of time. The clock may be coupled to the processor and configured to record a timestamp (e.g., year, month, date, hour, minute, and second) of an event. For example, the clock may record a timestamp associated with a pressure detected by the pressure sensor, a temperature detected by the temperature sensor, and/or a fluid level detected by the level sensor. The clock may be configured to provide the timestamp upon receipt of a command. The recorder, the apparatus, the control system, and/or the user device may send a command to the clock to provide the timestamp. The CCA data, for example, may be associated with a timestamp. A timestamp of interest may be provided by the recorder, may be sent by the apparatus, the control system, and/or may be sent from a user device.

The communication interface may be configured to transmit the CCA data regarding a timestamp of interest. The CCA data regarding a timestamp of interest may be transmitted, using the communication interface, to a control system. The control system may send a first command to the recorder to record the tank data at a first timestamp and then send a second command at a second timestamp separated from the first timestamp by a predetermined time duration. In this manner the control system may determine a change in the CCA data. Subsequent commands such as a third command, a fourth command, through an $n^{th}$ command may produce CCA data sent back to the control system from which the control system can determine a trend in the CCA data such as a rate of change of the CCA data.

Memory 346 may be configured to store the CCA data. Memory 346 may store the CCA data until receipt of a command to transmit the CCA data using the $H_2S$ sensor, the $CO_2$ sensor, the pressure sensor, the temperature sensor, and/or the communication interface. The CCA data may be transferred continuously so that operators and engineers have realtime data to witness the well and problem behavior. Access to realtime data may permit actions being taken in rapid response to sudden change in the well behavior, and may thus mitigate or avoid unwanted well control events.

Figure 4:
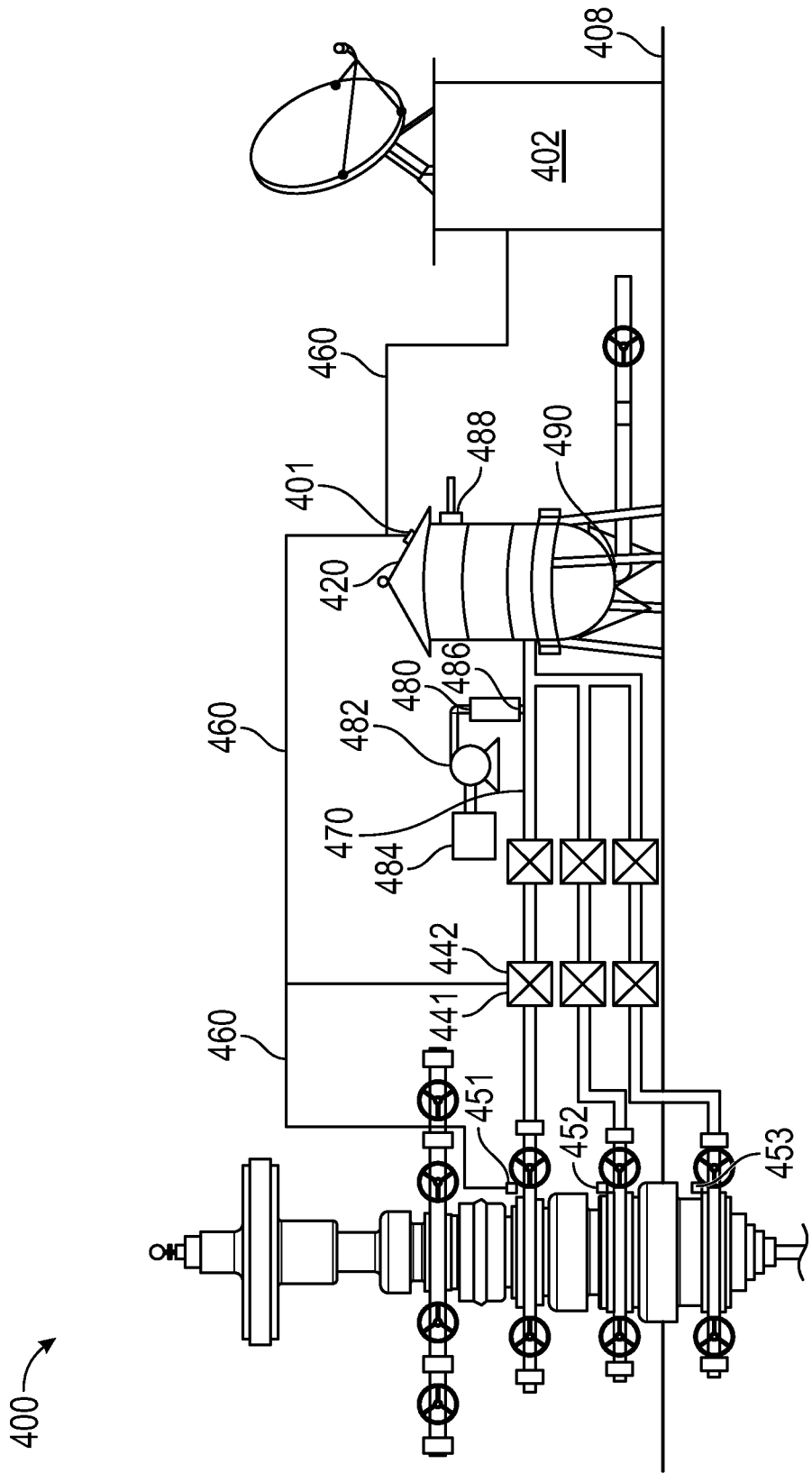

FIG. 4 shows the disclosed system (e.g., system 400) and apparatus (e.g., apparatus 401) in accordance with one or more embodiments. The disclosed system may have, for example, a control system (e.g., control system alpha 402) on a well surface (e.g., surface 408). As described in FIG. 2, the well has a first pipe component such as a casing string in a wellbore. The casing may form an annular space between the outside diameter of the casing and an inner diameter of the wellbore. The casing may form an annular space between the casing inside diameter and an outside diameter of another casing string installed inside the casing. The annular space may be in fluid communication with a pressurized reservoir (e.g., reservoir 102, FIG. 1). Each of the annular spaces is known as an annulus or, more specifically, a casing-casing annulus or CCA. CCA may be used to refer to other annular spaces such as a casing-wellbore annulus and a tubing-casing annulus.

Connections on the wellhead of the well may couple the CCA with a relief tank (e.g., tank 420) used for receiving and storing annular fluid that has been the bled-off from the annulus or one or more annuli from the well. The tank fluid is stored in a closed system until the tank level is reduced or the tank is emptied or exchanged. The tank level may be reduced by disposing the tank fluid by transferring the tank fluid to a production line. The tank fluid may be transferred to another tank such as a mobile tank. The relief tank may be a mobile tank. The mobile tank may be transportable by a vehicle of convenience such as a pickup truck. An empty mobile tank may be used to replace a full or partly full relief tank.

FIG. 4 shows the connections on the wellhead may be in fluid communication with the CCAs of the well. For example, at least one of a control valve (e.g., a first control valve 441) may be in fluid communication with a first annular space. The first control valve may have a first communication interface 442. The system may include a first recorder (e.g., first recorder 451) for detecting first recorder data of the first annular space. The system includes a fluid conduit (e.g., conduit 470) for flowing annular fluid from the annuli in the wellbore. The fluid conduit is in fluid communication with the first annular space, the first control valve, and the relief tank.

FIG. 4 shows that there may be a second conduit, third conduit, or more conduits, connected to a second annular space, a third annular space, or more annular spaces. Each conduit is configured for flowing annular fluid from each annular space to the relief tank. Each conduit may have one or more control valves and each valve may have a communication interface. The system may include a second recorder (e.g., second recorder 452) for detecting second recorder data of the second annular space. The system may include a third recorder (e.g., third recorder 453) for detecting third recorder data of the third annular space.

FIG. 4 shows a communication cable (e.g., cable 460) coupled to the control system, the control valve, and the first recorder. The first recorder transmits the first recorder data using the communication interface. In like manner a communication cable may couple the control system to each control valve and each recorder of each additional conduit.

The system may be equipped with emergency relief valves. The tank relief valves are configured to relieve pressure from inside the tank. The tank relief valves may be set to open at a pressure below the maximum tank rated pressure. The pressure may be relieved to atmosphere, to a flare, or to a process system. For example, tank pressure may be released through a preconnected release line between the emergency relief valve and the production line. This valve and plumbing arrangement provides a mitigation against the tank rupturing in case of emergency. For example, the emergency relief valve may open if the pressure inside the tank unexpectedly increases or if the control system malfunctions. For example, a control system malfunction may occur if tank pressure data was not transferred successfully.

Using the system 400, the well may continue producing while pressure and/or flow in the CCA exists. For example, while producing the well the relief bleed off system (system 400) can be operated to open hydraulic and gaseous communication between the CCA and the tank to start filling the tank. The fluid level and pressure sensor along with the notification system installed on the bleed off tank cooperate to send a message to the responsible party based on the preset pressure and fluid level set by the system owner. The notification will give an indication of the current situation of the level and pressure. Using the transferred data, the responsible party can take further action such as bleeding the CCA pressure to the tank or to continue producing the well as normal. In this manner, the well annulus pressure (CCA) and fluid are bled to a complete surface system for processing and to be discharged into the production line and/or to the relief tank. Fluid discharged to the relief tank may be transferred for further processing or transportation.

Using the system 400, undesirable components of the annular fluid composition may be managed. An example undesirable component is the poison gas hydrogen sulfide ($H_2S$). $H_2S$ is a very toxic and pungent gas that causes problems in both the upstream and downstream oil and gas industry. $H_2S$ may be in a gaseous state and/or may be dissolved in the annular fluid. System 400 uses a hydrogen sulfide sensor in the recorders to detect the presence of the gas. System 400 may compare the concentration level of the H2S with a limit. If the system determines that the bled-off fluid and gas from the CCA has hydrogen sulfide above a predetermined limit, then the hydrogen sulfide gas can be treated by adding one or more of a scavenger such as a hydrogen sulfide scavenger (e.g., scavenger 480) to treat the fluid. Scavenging the hydrogen sulfide provides a mitigation against hydrogen sulfide being bled to atmosphere in the event of an unplanned spill or release. The scavenger treating quantity will depend on the fluid rate from the CCA (e.g., a process stream) and on the concentration of the hydrogen sulfide associated with the fluid. The system may utilize an $H_2S$ scavenger in order to remove the deadly effect of $H_2S$. In the event of a fluid leak or a spill, the $H_2S$ scavenger may react and remove the $H_2S$ from fluid, thus mitigating or eliminating the associated risk of $H_2S$.

The scavenger may treat the gas for other undesirable contaminants such as $CO_2$. $CO_2$ may combine with water to form carbonic acid that causes further problems. Considering $H_2S$ removal, the process of removing $H_2S$ is known as gas sweetening, by either iron sponge $H_2S$ scrubbers (forming iron sulfide) or chemical scavengers. Typical $H_2S$ scavengers used in the oilfield are amine-based chemicals. They can be roughly categorized into regenerative and non-regenerative $H_2S$ scavengers.

Regenerative $H_2S$ scavengers (RHSs) may use chemicals that absorb the $H_2S$. Such chemicals are termed absorbents and may include amine solutions. After absorbing the $H_2S$, the chemicals are then regenerated, for example by heating, and then the chemicals are reused. The separated $H_2S$ may be treated to form a less harmful chemical such as elemental sulfur. A treatment process may include, for example, a desulfurizing process such as the Claus process wherein the $H_2S$ is combined with oxygen ($O_2$) to form sulfur and water. The amines may include N-methyl diethanolamine (MDEA). MDEA-based amine gas sweetening processes may absorb only $H_2S$. Other processes may be used to absorb $CO_2$. For example, monoethanolamine (MEA), diethanolamine (DEA), and diglycolamine (DGA) typically absorb other acid gases as well (i.e., $CO_2$) besides $H_2S$.

RHSs may use application processes such as amine gas treating. Amine gas treating removes $H_2S$ from within the gas stream.

Non-regenerative $H_2S$ scavengers (NRHSs) may use chemicals that absorb the $H_2S$. For example, the chemicals may react with the $H_2S$ to scavenge it. Triazines are among several types of NRHSs. Triazine examples include 1,2,3-triazine, 1,2,4-triazine, 1,3,5-triazine or s-triazine. Another type of NRHS includes solid scavengers, such as zinc- or iron-based materials. Oxidizing chemicals may be used for NRHSs. Oxidizer examples include sodium chlorite ($NaClO_2$), sodium bromate ($NaBrO_3$), sodium nitrite ($NaNO_2$), and others. Aldehydes such as glyoxal may be used for NRHSs. Glyoxal may be applied in neutral, acidic, and alkaline conditions. Metal carboxylates and chelates may be used as NRHSs. Both water- and oil-soluble high valence metal chelates may be used as NRHSs.

NRHSs may use application processes to finely disperse a liquid chemical into the process stream to maximize reaction with the $H_2S$. For example, liquid chemicals may be applied via an in-line injection quill. NRHSs may use a contact tower to expose a solid chemical to the process stream to react with the $H_2S$.

Determining a dosage of an $H_2S$ scavenger includes measuring the $H_2S$ and/or $CO_2$ concentration and characteristics within the process stream. Determining the dosage may include measuring the flowrate, temperature, pressure, and other characteristics of the process stream. Using the measured characteristics, calculating the dosage is based on the amount of sulfur to be removed.

Exposing the $H_2S$ to the scavenger may include the use of an injection pump (e.g., scavenger pump 482) coupled to and in fluid communication with the annular fluid at a location such as the fluid conduit. The injection pump may be configured to receive a scavenger substance from an $H_2S$ scavenger storage (e.g., storage 484) and inject the scavenger into the process stream. The injection point may use a chemical injection quill (e.g., quill 486) in fluid communication with the annular fluid and disposed, for example, on the fluid conduit.

The annular fluid exiting the wellhead (the process stream) may flow through the fluid conduit to the relief tank. The annular fluid may be analyzed to measure constituent parts or composition. For example, the water, the oil, and the gas may be measured with a multiphase flowmeter. The annular space may be monitored with a contaminant sensor for contaminants such as the $H_2S$ concentration and the $CO_2$ concentration may be measured. For example, a poison gas sensor may measure the $H_2S$ concentration. A comparison may be made using the measurements and a predetermined acceptance criterion. Depending on the result of the comparison, a determination may be made as to the destination of the process flow. For example, upon failing to meet the predetermined acceptance criterion, the process flow may be directed from the wellhead through the fluid conduit to an inlet of a first contact tower and/or a first separator (e.g., tank 420). Gasses such as treated gas may flow out of the separator at a sweet gas outlet (e.g., gas outlet 488) and liquids such as treated liquids and spent scavenger substance may flow out of the separator at a liquid drain outlet (e.g., liquid outlet 490).

Two or more contact towers and/or separators may be arranged in series. For example, the gasses exiting the gas outlet and the liquids exiting the liquid outlet may again be analyzed to measure constituent parts. For example, the $H_2S$ and the $CO_2$ concentrations may be measured. The measurements may be compared with a predetermined acceptance criterion. The gasses and/or the liquids, upon failing to meet the predetermined acceptance criterion, may be directed to flow to a second contact tower and/or a second separator.

The process stream may be recirculated one or more cycles. For example, the gasses and/or the liquids, upon exiting the first and/or second tank may have contaminant (e.g., $H_2S$ and $CO_2$) concentrations measured, may have the measurements compared with a predetermined criteria, and may have the flow path determined as a result of the comparison. For example, upon failing to meet the predetermined acceptance criterion, the process stream may flow back to the inlet of the contact tower and/or separator.

The relief tank may include a tank condition sensor apparatus (e.g., apparatus 401) to determine a real-time tank status (e.g., a tank condition) and to record an operational record such as a tank condition log (e.g., a tank log.) The sensor apparatus includes various sensors to monitor the condition of the tank, the condition of the contents of the tank, to generate tank data, and to record the tank log. For example, the tank may be equipped with the apparatus 401 having a level sensor, a pressure sensor, and/or a temperature sensor. The sensor apparatus may include a tank processor coupled to the tank sensors. The tank processor may record the tank data after the tank sensor receives a command to start to determine the tank data.

The sensor apparatus may include a tank communication interface (e.g., communication interface 312, FIG. 3) configured to communicate the tank data from the tank sensors to the control system. The tank sensors may include one or more of a tank sensor memory (e.g., memory 316, FIG. 3). The tank sensors may record the tank data using the sensor memory. The tank memory may store the tank data. Upon or soon after receipt of the command to record the tank data, the tank sensors will begin to generate the tank log using the tank data. Using the communication interface, the tank sensors will transmit the tank log to the control system and/or to a user device.

The command to record the tank data may be preprogrammed to start automatically or may have an operational limitation. For example, the command may be based on an input from the user device. The sensor apparatus may communicate the tank condition and/or the tank log to a user device. One or more production parameters of a production operation may be adjusted based on an input from the user device.

The tank interface may communicate with the control system using a data cable or may communicate wirelessly. The data cable may be replaced by wireless communication such as, for example, using routers and modems for a local area network and/or a wide area network, or using radio, microwave, Bluetooth, or cellular communication. The tank interface may communicate to a user device through the control system and/or directly to the user device. The tank interface may communicate the data to the user device.

The sensor apparatus may generate and record an alert and may report the alert to the control system and/or the user device. In addition to storing the operational record such as the tank log, the operational record may be reported, for example, to a notification center and may further be reported with the alert and an advisory to the notification center and/or one or more concerned entities (e.g., a technician), as desired. The report may include the tank level, tank pressure, and/or tank temperature. The report may include the $H_2S$ concentration and/or the $CO_2$ concentration. The report may include the process stream composition regarding ratios of water, oil, and gas.

Figure 5:
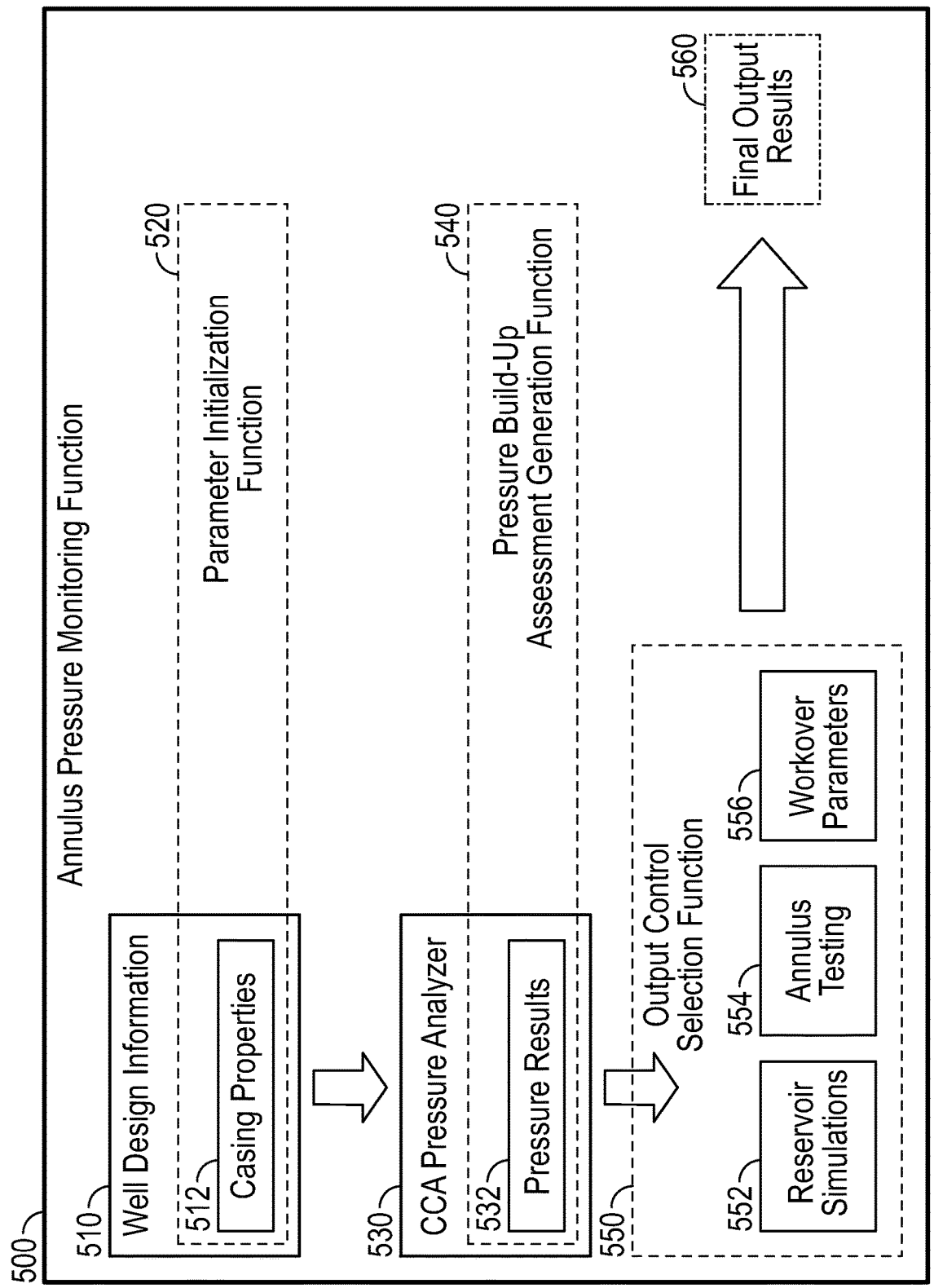

FIG. 5 shows the management system. The management system performs a method to automatically bleed off the CCA pressure to a pressure relieving tank. The management system uses surface facilities such as the tank and one or more of the control valves. The management system includes a data transfer system and a data acquisition system and includes a processor used to perform the automatic control. The management system software program has a set of instructions stored in a memory. The instructions include using the management system for sending and receiving signals, performing calculations, and evaluating the acquired data by comparing the data to predetermined acceptance criteria. The management system includes alarms and alerts for users and includes sending and receiving commands to a user device.

The disclosed system, apparatus, and method includes receiving an alarm of the risk associated with the pressure at surface, monitoring this pressure continuously, and bleeding this pressure periodically while operating the well. Due to the fact the CCA pressure can be associated with the presence of oil, gas, or sour fluid (fluid with dissolved sour gas and/or other contaminants), bleeding the existing pressure is performed in a closed and isolated system to ensure the safety of personnel and to maintain unwanted release to the environment.

The disclosed system, apparatus, and method can achieve relieving the CCA pressure while managing the bled-off annular fluid by keeping it in storage until disposed of safely. The pressure-fluid relief tank and other components exposed to the bled-off fluid will be designed for compatibility with the well parameters, the pre-assessment of the CCA pressure, CCA bleed off rate, and the properties (i.e., the fingerprint) of the bled-off fluid. This design can differ in size based on the bleed off rate and the tank fluid disposal time frequency agreed on during the design phase.

FIG. 5 illustrates a successive flow of parameters implemented in monitoring annular fluid data such as pressure, temperature, flowrate, and composition. In this example, FIG. 5 illustrates monitoring an annulus pressure of a well by an annulus pressure monitoring function 500. The annulus pressure monitoring function 500 may be hardware and/or software configured to monitor the pressure in the annulus of the hydrocarbon well. The annulus pressure monitoring function may be applied to annulus composition monitoring, annulus temperature monitoring, and/or other annular fluid data, etc. In FIG. 5, the annulus pressure monitoring function 500 may be implemented by one or more devices described in reference to reservoir simulator 160 of FIG. 1, in reference to the apparatus 300, first recorder 351, second recorder 352, and third recorder 353 of FIG. 3, system 400, apparatus 401, control system alpha 402, and tank 420 of FIG. 4, or in reference to the computer system (e.g., computer 702) of FIG. 7.

Figure 7:
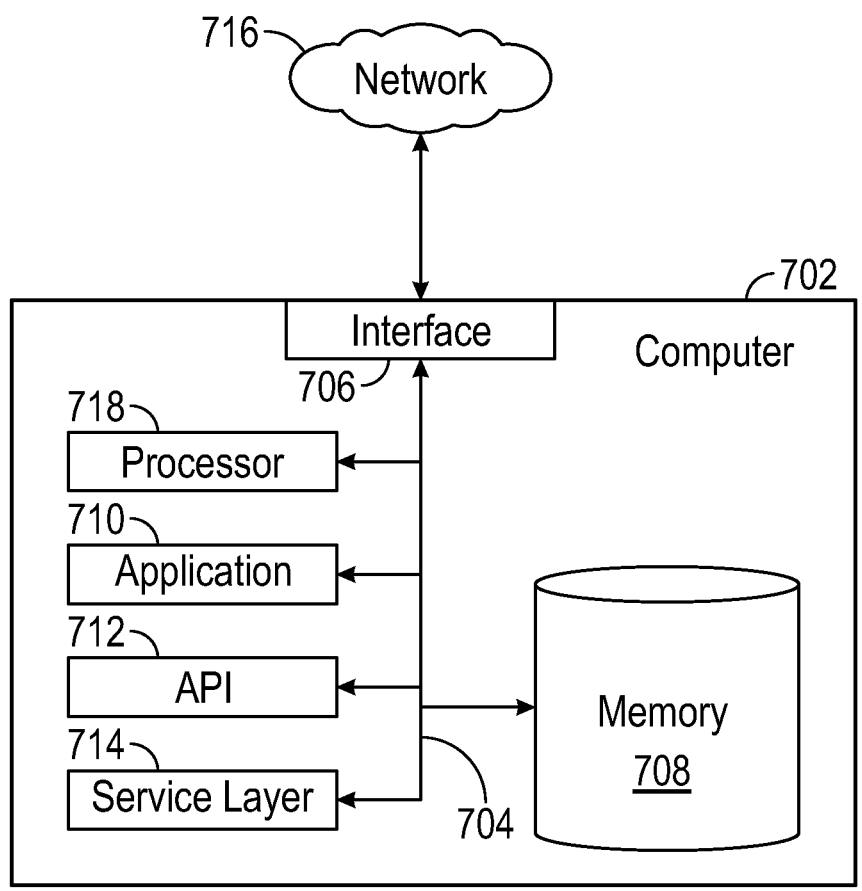
FIG. 7 shows a computer system in accordance with one or more embodiments.

For example, the annulus pressure monitoring function 500 may be implemented in the tank apparatus processor (e.g., processor 314 of FIG. 3) or the recorder processor (e.g., processor 344 of FIG. 3), or the computer processor 718 of FIG. 7. In some embodiments, the annulus pressure monitoring function 500 identifies well design information 510 including casing properties 512, i.e., pipe component data, for using in a parameter initialization function 520 of an area of interest. Pipe component data may include pipe inside diameter, pipe outside diameter, pipe wall thickness, pipe material grade, etc. Well simulation data predetermined criteria may include pressure that the wellbore can handle and pressure that the pipe component can handle (i.e., before collapsing from high exterior pressure.) The area of interest is any CCA, any casing portion, or any section of a wellbore. The areas of interest may be areas in which pressure communication may be identified. Pressure communication may be identified by the presence of CCA pressure, i.e., pressure in the annulus. In some embodiments, the method and the system perform periodic surveys, recording the data as CCA pressure logs, to monitor an annulus pressure of the well in the area of interest.

In the parameter initialization function 520, the parameters associated with the well design information 510 are selected based on their relevance. The parameter initialization function 520 may share processing with a build-up assessment generation function 540, which controls a CCA pressure analyzer 530 indicating a pressure result (e.g., pressure results 532) in which an iterative loop determines a number of required pressure results. The iterative loop is a representation of the repetitive process to evaluate subsequent parameters based on the periodic surveys on the annulus until a final time of the iterations is reached. The iterative loop is implemented by the combination of the machine learning algorithm and the artificial intelligence algorithm. The final time may be controlled by hardware or software of the annulus pressure monitoring function 500.

Once the CCA pressure analyzer 530 processes the pressure results, an output control selection function 550 may perform processing of the initialized parameters to perform fluid return determination 552, perform annulus testing 554, and update workover parameters 556. As a result, final output results 560 may be obtained for instructing the implementation of remedial actions or workover operations. To this end, the annulus pressure monitoring function 500 may provide the possibility to generate decisions as to any workover instructions based on the best course of action to prevent future CCA issues.

FIG. 5 expands on the functions of the CCA pressure analyzer 530 and the reservoir simulator 160 from FIG. 1. In one or more embodiments, the method identifies and selects workover suggestions to be implemented in the well. Workover candidate wells are wells that are identified as having sustained casing pressure for offshore/onshore hydrocarbon wells during well operational phases and a shutdown conditions. In some embodiments, the annulus pressure monitoring function 500 generates the decision that recommends a proper workover plan with the best remedial action programs.

The annulus pressure monitoring function 500 may generate, record, and report an alert to operators. In some embodiments, the annulus pressure monitoring function 500 is used as a tool to develop a strategy for upcoming workover programs. According to one or more embodiments, managing the CCA pressure and providing alerts may permit the well to continue operating without sustained downtime. Managing the CCA pressure maintains well integrity and safety, maintains well productivity, maximizes well operation life, identifies CCA problems, resolves any uncertainty related to well integrity conditions, provides a cost-effective approach without downhole intervention. Managing CCA pressure may help prevent oil spills, gas leaks, and environment impact. It may prevent risks of a well blowout and damage to assets. It may prevent underground fluid invasion into water aquifers. Managing CCA pressure may avoid downhole cross flow between multiple oil-bearing reservoirs and may prevent formation damage due to dumping water into oil bearing reservoirs. Managing CCA pressure may minimize hydrocarbon leaks that may jeopardize a production pad or offshore platform.

Figure 6:
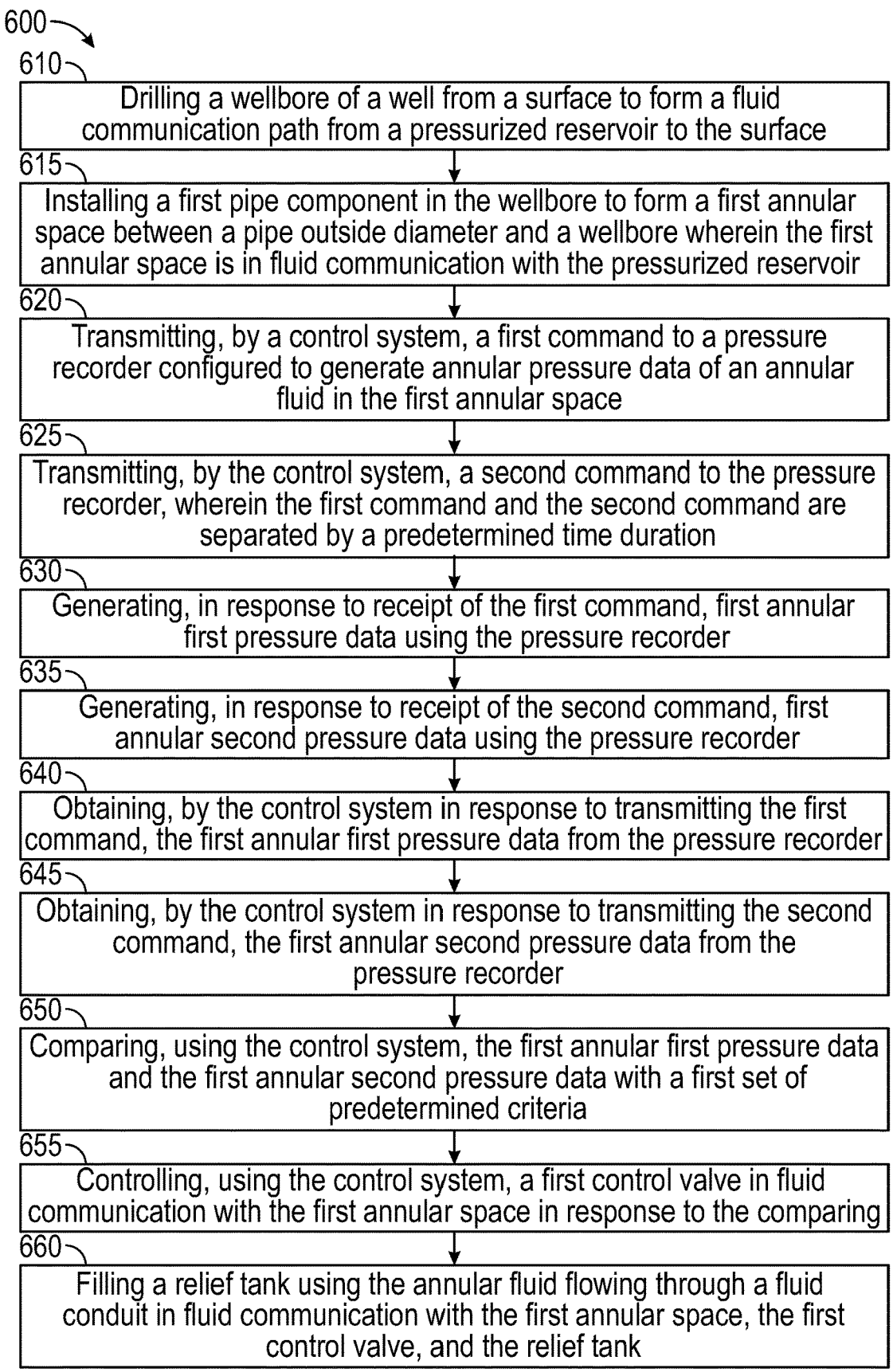
FIG. 6 shows a flowchart in accordance with one or more embodiments.

FIG. 6 shows a flowchart in accordance with one or more embodiments. Specifically, FIG. 6 describes a method 600 for operating a well while managing casing-casing annulus (CCA) behavior using a control system, a CCA recorder, a control valve, a fluid conduit, and a relief tank. In some embodiments, the method may be implemented using the devices described in reference to FIGS. 1-5. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Block 610, a wellbore of a well is drilled from a surface location at a wellsite to form a fluid communication path from a pressurized reservoir in a formation to the surface location.

At Block 615, a first pipe component is installed in the wellbore to form a first annular space between a pipe outside diameter and a wellbore wherein the first annular space is in fluid communication with the pressurized reservoir. A second pipe component may also be disposed in the wellbore to form a second annular space of the one or more annuli between a second outside diameter and the inside diameter of the first pipe component. The second annular space may be in fluid communication with the pressurized reservoir. A second control valve may be in fluid communication with the second annular space and the fluid conduit and the second control valve may have a second communication interface.

At Block 620, a control system transmits a first command to a pressure recorder configured to generate annular pressure data of an annular fluid in the first annular space. For example, the first recorder may have a processor, a memory, and a data cable connector to couple to a communication cable. The first recorder is configured to receive, over the communication cable, a request to acquire the first recorder data. The memory of the recorder, the memory of the apparatus, and/or the memory of the computer system is/are configured to store the first recorder data until the first recorder data is transmitted to the control system. A second recorder may be coupled to the communication cable to detect second recorder data of the second annular space. The second recorder may transmit the second recorder data to the control system using the second communication interface.

At Block 625, the control system transmits a second command to the pressure recorder, wherein the first command and the second command are separated by a predetermined time duration.

At Block 630, the pressure recorder generates first annular first pressure data in response to receipt of the first command. For example, the control system may determine an annular fluid characteristic, such as pressure, of a predetermined annular space, such as CCA-1 using the first recorder at a first timestamp. Then the control system may determine the annular fluid characteristic of the predetermined annular space using the first recorder at a second timestamp. The control system may determine whether the annular fluid characteristic of the predetermined annular space satisfies a predetermined criterion. For example, the control system may determine if the pressure in the annular space (the CCA pressure) falls below a maximum allowable pressure (e.g., satisfies the criterion) or exceeds that pressure (e.g., fails to satisfy the criterion). In response to determining that the predetermined annular space fails to satisfy the predetermined criterion, a production operation may continue at the wellbore. For example, if the CCA pressure exceeds the allowable pressure, then the control system may continue to operate the well by using the CCA management system to manage the CCA pressure.

At Block 635, the pressure recorder generates first annular second pressure data in response to receipt of the second command.

At Block 640, the control system obtains the first annular first pressure data from the pressure recorder in response to transmitting the first command.

At Block 645, the control system obtains the first annular second pressure data from the pressure recorder in response to transmitting the second command.

At Block 650, the control system compares the first annular first pressure data and the first annular second pressure data with a first set of predetermined criteria.

At Block 655, in response to the comparing, the control system controls a first control valve in fluid communication with the first annular space. The control system may perform a well simulation of the wellbore in one or more wells to predict a CCA return rate, e.g., a bleed-off rate. The bleed-off rate may include, for example, the frequency of opening and closing the control valve to maintain the CCA pressure. The bleed-off rate may include the volume and composition of the annular fluid. Using the predicted bleed-off rate, a tank capacity of the relief tank may be determined.

For example, given the following parameters, a tank volume can be determined. Using a CCA return rate measured at 1 gal per day, a field crew visit frequency may be scheduled for one visit every 30 days. The field crew visit frequency of one visit per 30 days is a predetermined tank emptying frequency and may be based on the result of performing a well simulation of the wellbore to determine a predicted tank fluid disposal time frequency. Using a tank volume contingency of 25% extra tank volume for safety, then the designed tank volume (a predicted tank capacity) is 53 gals. Again, the predicted tank capacity may be based on the result of performing a well simulation of the wellbore. Material selection for the tank will be determined in a similar manner. If the fluid return is found to be toxic, water, hydrocarbon, or mixture this will be taken into account for manufacture of the appropriate tank for each specific well. Performing a well simulation of the wellbore may determine a set of tank material properties.

At Block 660, the annular fluid fills a relief tank by flowing through a fluid conduit that is in fluid communication with the first annular space, the first control valve, and the relief tank.

As the well is producing, the well simulation result may indicate that the predicted tank fluid disposal time frequency, the tank capacity, and/or the tank materials may not meet the requirements resulting as an output from the simulation. The control system may adjust one or more production parameters of the production operation at the wellbore in response to the result of the well simulation.

Tanks that are at or near full capacity may either have their contents transferred to the production line or the tank itself may be replaced with another tank where it can be disposed of safely. The tank may be designed to be mobile, transportable, and to fit in a vehicle of opportunity such as a pickup truck. CCA pressure is usually associated with high pressure and very low rate, so the relief tank capacity is expected to be sized to last for a relatively long duration without having to be sized so big that the tank costs become prohibitive in comparison with other remediation options. An engineering design would be implemented to estimate and decide on the proper tank size after studying the well CCA pressure behavior. The engineering design may include involving reservoir engineering for fingerprinting the CCA fluid. Reservoir engineering may also provide an assessment regarding the likelihood, the pressure, and the rate of the CCA fluids reaching the surface. The system would be included in asset maintenance programs for periodic check-ups and maintenance to ensure functionality of the bleed-off system. Use of the disclosed system may have an impact on the integrity of the casing containing the CCA fluids. For example, it may be determined that the casing CCA pressure log intervals and scope need to be revised such as with increased frequency of obtaining the logs to ensure functionality of the casing.

While FIGS. 1-6 show various configurations of components, other configurations may be used without departing from the scope of the disclosure. For example, various components in FIG. 1-5 may be combined to create a single component. As another example, the functionality performed by a single component may be performed by two or more components.

Embodiments may be implemented on a computer system. FIG. 7 is a block diagram of a computer system such as the computer 702 used to provide computational functionalities associated with described algorithms, methods, functions, processes, flows, and procedures as described in the instant disclosure, according to an implementation. The illustrated computer (computer 702) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may include a computer that includes an input device, such as a keypad, keyboard, touch screen, or other device that can accept user information, and an output device that conveys information associated with the operation of the computer 702, including digital data, visual, or audio information (or a combination of information), or a graphical user interface.

The computer 702 can serve in a role as a client, network component, a server, a database or other persistency, or any other component (or a combination of roles) of a computer system for performing the subject matter described in the instant disclosure. The illustrated computer (computer 702) is communicably coupled with a network 716. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence server, or other server (or a combination of servers).

The computer 702 can receive requests over network 716 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 704. In some implementations, any or all of the components of the computer 702, both hardware or software (or a combination of hardware and software), may interface with each other or the interface 706 (or a combination of both) over the system bus 704 using an application programming interface (an API 712) or a service layer 714 (or a combination of the API 712 and service layer 714. The API 712 may include specifications for routines, data structures, and object classes. The API 712 may be either computer-language independent or dependent and refer to a complete interface, a single function, or even a set of APIs. The service layer 714 provides software services to the computer 702 or other components (whether or not illustrated) that are communicably coupled to the computer 702. The functionality of the computer 702 may be accessible for all service consumers using this service layer. Software services, such as those provided by the service layer 714, provide reusable, defined business functionalities through a defined interface. For example, the interface may be software written in JAVA, C++, or other suitable language providing data in extensible markup language (XML) format or other suitable format.

While illustrated as an integrated component of the computer 702, alternative implementations may illustrate the API 712 or the service layer 714 as stand-alone components in relation to other components of the computer 702 or other components (whether or not illustrated) that are communicably coupled to the computer 702. Moreover, any or all parts of the API 712 or the service layer 714 may be implemented as child or sub-modules of another software module, enterprise application, or hardware module without departing from the scope of this disclosure.

The computer 702 includes an interface 706. Although illustrated as a single one of interface 706 in FIG. 7, two or more of the interface 706 may be used according to particular needs, desires, or particular implementations of the computer 702. The interface 706 is used by the computer 702 for communicating with other systems in a distributed environment that are connected to the network 716. Generally, the interface 706 includes logic encoded in software or hardware (or a combination of software and hardware) and operable to communicate with the network 716. More specifically, the interface 706 may include software supporting one or more communication protocols associated with communications such that the network 716 or interface's hardware is operable to communicate physical signals within and outside of the illustrated computer (computer 702).

The computer 702 includes at least one of a computer processor 718. Although illustrated as a single one of the computer processor 718 in FIG. 7, two or more processors may be used according to particular needs, desires, or particular implementations of the computer 702. Generally, the computer processor 718 executes instructions and manipulates data to perform the operations of the computer 702 and any algorithms, methods, functions, processes, flows, and procedures as described in the instant disclosure.

The computer 702 also includes a memory 708 that holds data for the computer 702 or other components (or a combination of both) that can be connected to the network 716. For example, memory 708 can be a database storing data consistent with this disclosure. Although illustrated as a single one of memory 708 in FIG. 7, two or more memories may be used according to particular needs, desires, or particular implementations of the computer 702 and the described functionality. While memory 708 is illustrated as an integral component of the computer 702, in alternative implementations, memory 708 can be external to the computer 702.

The application 710 is an algorithmic software engine providing functionality according to particular needs, desires, or particular implementations of the computer 702, particularly with respect to functionality described in this disclosure. For example, application 710 can serve as one or more components, modules, applications, etc. Further, although illustrated as a single one of application 710, the application 710 may be implemented as a multiple quantity of application 710 on the computer 702. In addition, although illustrated as integral to the computer 702, in alternative implementations, the application 710 can be external to the computer 702.

There may be any number of computers such as the computer 702 associated with, or external to, a computer system containing computer 702, each computer 702 communicating over network 716. Further, the term "client," "user." and other appropriate terminology may be used interchangeably as appropriate without departing from the scope of this disclosure. Moreover, this disclosure contemplates that many users may use one of computer 702, or that one user may use multiple computers such as computer 702.

In some embodiments, the computer 702 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
   drilling a wellbore of a well from a surface to form a fluid communication path from a pressurized reservoir to the surface;
   installing a first pipe component in the wellbore to form a first annular space between a pipe outside diameter and the wellbore wherein the first annular space is in fluid communication with the pressurized reservoir;

transmitting, by a control system, a first command to a pressure recorder configured to generate annular pressure data of an annular fluid in the first annular space;

transmitting, by the control system, a second command to the pressure recorder, wherein the first command and the second command are separated by a predetermined time duration;

generating, in response to receipt of the first command, first annular first pressure data using the pressure recorder;

generating, in response to receipt of the second command, first annular second pressure data using the pressure recorder;

obtaining, by the control system in response to transmitting the first command, the first annular first pressure data from the pressure recorder;

obtaining, by the control system in response to transmitting the second command, the first annular second pressure data from the pressure recorder;

comparing, using the control system, the first annular first pressure data and the first annular second pressure data with a first set of predetermined criteria;

controlling, using the control system, a first control valve in fluid communication with the first annular space in response to the comparing; and filling a relief tank using the annular fluid flowing through a fluid conduit in fluid communication with the first annular space, the first control valve, and the relief tank.

2. The method of claim 1, further comprising:

installing a second pipe component in the first pipe component to form a second annular space between a second outside diameter and a first pipe inside diameter wherein the second annular space is in fluid communication with the pressurized reservoir;

transmitting, by a control system, a first command to a pressure recorder configured to detect an annular pressure of an annular fluid in the second annular space;

transmitting, by the control system, a second command to the pressure recorder, wherein the first command and the second command are separated by a predetermined time duration;

obtaining, by the control system in response to transmitting the first command, second annular first pressure data from the pressure recorder;

obtaining, by the control system in response to transmitting the second command, second annular second pressure data from the pressure recorder;

comparing, using the control system, the second annular first pressure data and the second annular second pressure data with a set of predetermined criteria; and controlling a control valve in fluid communication with the first annular space in response to the comparing; and filling a relief tank using the annular fluid flowing through a fluid conduit in fluid communication with the second annular space, the control valve, and the relief tank.

3. The method of claim 2, further comprising:

performing a workover operation based on a well simulation, using the second annular first pressure data, the second annular second pressure data, and pipe component data at the second annular space.

4. The method of claim 1, further comprising:

performing a well simulation of the wellbore in one or more wells for a bleed-off rate using the first annular first pressure data, the first annular second pressure data, the predetermined time duration, pipe component data, and annular fluid data; and determining a predicted tank capacity of the relief tank for the one or more wells using the well simulation.

5. The method of claim 1, further comprising:

performing a well simulation of the wellbore of one or more wells for a bleed-off rate using the first annular first pressure data, the first annular second pressure data, the predetermined time duration, pipe component data, and annular fluid data; and determining a predicted tank fluid disposal time frequency for the one or more wells using the well simulation.

6. The method of claim 1, further comprising:

performing a well simulation of the wellbore of one or more wells for a bleed-off rate using the first annular first pressure data, the first annular second pressure data, the predetermined time duration, pipe component data, and annular fluid data; and determining a set of tank material properties for the one or more wells using the well simulation.

7. The method of claim 1, wherein the control system adjusts one or more production parameters of a production operation at the wellbore based on the first annular first pressure data, pipe component data, and/or well simulations of the wellbore of one or more wells at the first annular space.

8. The method of claim 1, further comprising:

performing a workover operation based on a well simulation, using the first annular first pressure data, the first annular second pressure data, and pipe component data at the first annular space.

9. The method of claim 1, further comprising:

transmitting, using a control system, a first command to a contaminant detector in fluid communication with the annular fluid;

obtaining, by the control system in response to transmitting the first command, contaminant data of the annular fluid from the contaminant detector;

comparing, using the control system, the contaminant data with a set of predetermined criteria;

controlling, using the control system, a scavenger disposed on the fluid conduit, in response to the comparing; and treating the annular fluid to scavenge contaminant from the annular fluid.

10. The method of claim 1, further comprising:

operating the well using the control system, the pressure recorder, the first control valve, the fluid conduit, and the relief tank.

* * * * *